UNITED STATES PATENT OFFICE

HERMAN HEUSER AND RAYMOND S. HEUSER, OF EVANSTON, ILLINOIS, ASSIGNORS, BY DIRECT AND MESNE ASSIGNMENTS, TO UNITED STATES PROCESS CORPORATION, OF CHICAGO, ILLINOIS, A CORPORATION OF ILLINOIS

REMOVAL OF VOLATILE CONSTITUENTS FROM FERMENTED LIQUIDS

No Drawing.   Application filed June 4, 1931.   Serial No. 542,193.

The present invention relates to the production of liquids containing ethyl alcohol derived by fermentation and which are free from fusel oil and aldehydes and other oxidation products and toxic products of fermentation. Thus, the invention may be employed for the production of fermented malt liquids of the tonic or medicinal type having a proper extract content as well as of other alcohol containing liquids, intended for medicinal and industrial use or as an intermediate in the manufacture of other material, and in which absolute freedom from aldehydes and higher alcohols is desired.

We have observed that many materials available as sources for such liquids free from oxidation products, higher alcohols and the like, do not respond to the removal of their toxic products by evaporation, under a vacuum, this being particularly true in the case of alcoholic liquids derived by fermentation from grain extracts, fruit and plant juices and the like. This we have found to be largely due to foam production, which continues as long as the vacuum lasts, and is produced by the pull of the vacuum and which materially impedes evaporation and may even cause a large portion of the liquid to be drawn over through the vapor line of the evaporator.

By the present invention we are able to effect the production of the above described liquids from foam-producing, fermented liquids while removing the oxidation products and toxic products of fermentation by evaporation under vacuum. We are also able by the present invention to improve the process of dealcoholizing such liquids under vacuum.

We have discovered that the foam production peculiar to foam-producing fermented liquids, when heated under a vacuum for the removal of oxidation products, toxic products of fermentation and other volatile constituents may be reduced by reducing the viscosity of the liquid or the viscosity of the foam bubbles. Thus, we have discovered that by a modification of the surface tension relations of the liquid reducing its viscosity and that of the foam bubbles of the liquid by a limited coagulation of the albuminoids of the liquid produced, for example, with albuminoid-precipitating agitation of the liquid or by the addition of suitable albuminoid precipitants to the liquid, by a preliminary treatment of the liquid with suitable proteolytic enzymes, and by the addition of a suitable fat to the liquid, the persistent foam-producing properties of the liquid may be sufficiently reduced so that they will not interfere with the removal of the oxidation products, the toxic products of fermentation or other volatile constituents by evaporation under vacuum.

The following example illustrates a specific embodiment of the invention:

The material treated may be a fermented cereal malt liquid containing varying proportions, say 5.00% of alcohol by volume and the necessary percentage of extract. The liquid is charged into a suitable vacuum pan which is only partly filled, the unfilled part being for foam. The liquid is put under a vacuum, the pressure being reduced to 7 lbs. absolute, and is heated to the temperature, at which a fermented cereal malt liquid containing 5% of alcohol by volume boils at 7 lbs. absolute pressure, which is about 75.7° C.

During the operation of bringing the liquid to a boil under the desired vacuum, there is no distillation of the toxic products contained in the fermented malt liquid taking place, as the liquid foams heavily. As soon as the foam reaches approximately the point where it would be drawn out of the pan to the source of vacuum supply, whereby the process would become inoperative, it is made to collapse suddenly by the introduction into the pan of gas, such as carbon dioxide, nitrogen or hydrogen (preferably carbon dioxide), which reduces the vacuum and thereby instantaneously collapses the foam. The gas is preferably introduced into the pan above the foam. The vacuum is raised again, and as soon as the foam again reaches the danger point, it is made to collapse again by the introduction of $CO_2$ or other inert gas. The actual rise of the liquid in the form of foam and the collapsing of the foam are repeated time and again causing an agitation of the material extending through all parts thereof and effecting coagulation of the more coagulable, highly colloidal albuminoids, which, in time reduces both the viscosity of the liquid and its foam-producing property so that the liquid will boil without excessive or harmful foaming. This may occur, for example, after 5 to 12 repetitions of the alternate foaming and collapse of the liquid.

When this stage has been reached, the liquid begins to produce a distillate, the removal of oxidation products, and toxic products of fermentation now taking place. The low boiling-point oxidation products of the fermentation, such as the aldehydes are soon removed, but the removal of the higher boiling point toxic or undesirable products of fermentation, such as fusel oil, takes some time, being completed, however, after about 30 to 35% of ethyl alcohol have been removed from the liquid. This point may be determined from the alcohol content of the distillate, in case the distillate is collected, or from the reduction in the alcohol percentage of the liquid, in case the distillate is wasted. The operation may be continued, if desired, until substantially all the alcohol is also removed.

The liquid, thus freed from its volatile undesired products, is cooled in the absence of air or oxygen to any suitable low temperature; say, 1 to 2° C., the cooled liquid being preferably subjected to treatment to keep it free from air or oxygen, in order to prevent aldehyde production, and to such other treatment, as will make it ready for the market.

The gas employed for the collapsing of the foam is a non-condensible gas, as it has to go to the pump to be pumped off there, for this reduces the vacuum, resulting in the collapse of the foam. The use of a condensible gas, such as steam, is undesirable, as it does not effectively reduce the vacuum, since the steam condenses in the condenser and thereby acts to produce vacuum rather than reduce it. This action of condensible gases is well known and is frequently used in vacuum distillation.

We find that carbonic acid gas is eminently fitted for the collapsing of the foam arising from a foam-producing liquid heated under a vacuum for the removal of the toxic products of fermentation, as it preserves the alcoholic liquid against oxidation of its constituents. Hydrogen and nitrogen may be similarly employed.

We have also employed air as the non-condensible gas for collapsing the foam in the operation heretofore described. However, in using air, instead of introducing it into the pan above the foam, we prefer to introduce it directly at or near the suction inlet of the vacuum pump. This has the advantage that the introduced air, being fed in near the pump, does not come into contact with the liquid, and therefore does not tend to produce oxidation or form aldehydes.

When the removal of the toxic products of fermentation is to be effected under a higher vacuum, with a correspondingly lower boiling temperature, for example, a pressure of 3 lbs. absolute, at which a liquid containing 5% of alcohol by volume boils at sea level at about 57.7° C., it is impossible to bring the liquid to a boil without excessive foam production solely by the viscosity-reducing agitation produced by the collapsing of its foam. This is due to the great velocity with which a vacuum as high as 3 lbs. pressure absolute draws out the liquid into foam, and to the low temperature of the liquid, both of which reduce the albuminoid coagulating action secured by collapsing the foam, as hereinbefore described.

Hence, when the removal of the toxic products of fermentation is to take place under such a high vacuum, we subject the liquid to a preliminary viscosity-reducing treatment by suitable proteolytic enzymes such as pepsin, bromelin, papain or peptase. For example, we may add to the liquid commercial pepsin, strength 1 to 3000, at the rate of 2 to 5 grams per 100,000 parts of liquid and then expose the liquid at a temperature of 40 to 45° C. to the proteolytic action of the enzyme for a period sufficient to reduce the foam viscosity by breaking down albuminoids (say 60 to 90 minutes), whereby the liquid can be brought to a boil under a high vacuum, after the foam has been made to rise and to collapse by the introduction of a non-condensible gas for a number of times as hereinbefore described.

We may also add to the liquid which is to be treated under a high vacuum for the removal of its toxic products of fermentation, a small proportion of suitable fat, say at least 1 gram and preferably 2 to 10 parts by weight per 100,000 parts of liquid. The treated liquid will come to a boil, after the foam has been made to rise and to collapse for some time by the introduction of a non-condensible gas. The fat by going into the membranes of the foam-bubbles reduces the viscosity of the foam-bubbles.

The fat addition may also be employed to advantage, when the distillation takes place under a less vacuum.

The melting point of the fat employed should be below the temperature, at which the boiling of the liquid for the removal of its volatile and toxic products of fermentation takes place, and the solidifying point of the fat should be above the temperature, to which the liquid is cooled and at which it is made ready for the market. The fat employed should be free from fatty acids and particularly of those that do not solidify upon the cooling of the liquid to the temperature at which it is made ready for the market. Suitable fats for the purpose are pure beef tallow and neutral lard, the former being suitable for operations under a low vacuum and the latter for operations under a low and high vacuum.

The solidified fat is removed from the cooled liquid by passing the same through a suitable filtering device, preferably right after the liquid has been cooled in the absence of air or oxygen to the desired low temperature, at which it is to be made ready for the market.

We claim:

1. In the removal of volatile constituents from alcoholic fermented liquids, preliminarily subjecting the liquid to alternate variations of reduced pressure below atmospheric and higher pressure, whereby the liquid is alternately drawn into foam and the foam collapsed, whereby the tendency of the liquid to form a persistent foam is destroyed, and subsequently subjecting the liquid to evaporation under reduced pressure.

2. In the removal of volatile constituents from a fermented foam-forming liquid, wherein such liquid derived from alcoholic fermentation is subjected to distillation under reduced pressure, the step of preliminarily subjecting such liquid to alternations of a reduced pressure below atmospheric and a higher pressure whereby its tendency to form a persistent foam is reduced.

3. In the removal of volatile constituents from alcoholic fermented liquids and the like, applying a vacuum to the liquid, whereby a foam is formed, and breaking the vacuum to destroy the foam, and repeating said alternate operations, thereby reducing the persistent foam-forming tendency of the liquid, and subsequently subjecting the liquid to evaporation under vacuum.

4. In the removal of volatile constituents from alcoholic fermented liquids, applying reduced pressure to the liquid, thereby forming a foam, supplying carbon dioxide above the liquid to cause collapse of the foam, and repeating the operations alternately, thereby modifying the persistent foam-forming tendencies of the liquid, and subsequently subjecting the liquid to distillation under vacuum.

5. In the removal of vaporizable constituents from alcoholic fermented liquids, modifying the surface tension of the liquid, and subjecting the liquid to alternate variations of a reduced pressure below atmospheric and a higher pressure, thereby successively forming foam and collapsing it and modifying the persistent foam-forming characteristics of the liquid, and subsequently subjecting the liquid to evaporation under pressure.

6. In the removal of vaporizable constituents from alcoholic fermented liquids, subjecting the liquid to the action of a proteolytic enzyme, thereby modifying its albuminoid content, subjecting the liquid to alternate variations of a pressure below atmospheric and a higher pressure whereby the liquid is successively caused to foam and the foam is collapsed and the persistent foam-forming characteristics of the liquid are modified, and evaporating the liquid under vacuum.

7. In the removal of vaporizable constituents from alcoholic fermented liquids, supplying a small proportion of a fat to the liquid, heating the liquid to a temperature such that the fat is liquid, subjecting the liquid to alternate variations of a pressure below atmospheric and a higher pressure, thereby forming a foam and collapsing it in succession, and modifying the persistent foam-forming characteristics of the liquid, and subjecting the liquid to evaporation under vacuum.

HERMAN HEUSER.
RAYMOND S. HEUSER.